(12) United States Patent
Borkowski et al.

(10) Patent No.: US 12,299,782 B2
(45) Date of Patent: May 13, 2025

(54) METHOD AND APPARATUS FOR ANALYZING COMPUTED TOMOGRAPHY DATA

(71) Applicant: RAYTHEON TECHNOLOGIES CORPORATION, Farmington, CT (US)

(72) Inventors: Luke B. Borkowski, West Hartford, CT (US); Sunilkumar O. Soni, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 453 days.

(21) Appl. No.: 17/726,704

(22) Filed: Apr. 22, 2022

(65) Prior Publication Data

US 2023/0342998 A1 Oct. 26, 2023

(51) Int. Cl.
*G06T 7/00* (2017.01)
*G01N 23/046* (2018.01)
(Continued)

(52) U.S. Cl.
CPC .......... *G06T 11/008* (2013.01); *G06T 7/0004* (2013.01); *G06T 7/11* (2017.01);
(Continued)

(58) Field of Classification Search
None
See application file for complete search history.

(56) References Cited

U.S. PATENT DOCUMENTS

| 5,946,371 A | * | 8/1999 | Lai | A61B 6/032 378/19 |
| 6,041,132 A | | 3/2000 | Isaacs et al. | |

(Continued)

FOREIGN PATENT DOCUMENTS

| CN | 106683176 | * | 5/2017 | ............. G06T 17/00 |
| EP | 3492912 | | 6/2019 | |
| JP | 6653164 | | 2/2020 | |

OTHER PUBLICATIONS

C. Sadowsky, J. D. Cohen and R. H. Taylor, "Rendering tetrahedral meshes with higher-order attenuation functions for digital radiograph reconstruction," VIS 05. IEEE Visualization, 2005., Minneapolis, MN, USA, 2005, pp. 303-310, doi: 10.1109/VISUAL.2005.1532809. (Year: 2005).*

(Continued)

*Primary Examiner* — Beniyam Menberu
(74) *Attorney, Agent, or Firm* — Carlson, Gaskey & Olds, P.C.

(57) ABSTRACT

A method of analyzing computed tomography data according to an example embodiment of the present disclosure includes obtaining computed tomography (CT) data for a component, fitting an interpolant function to the CT data, and creating a mesh of a surface that extends through the component. The surface is arbitrary and non-planar. The method also includes querying the interpolant function at a plurality of points of the mesh to project the CT data onto the mesh, calculating a metric of the component based on the querying, and providing a notification of the metric. A system for computed tomography analysis is also disclosed. A method of analyzing computed tomography data for a component of a gas turbine engine that includes calculating a void area fraction is also disclosed.

17 Claims, 4 Drawing Sheets

(51) Int. Cl.
G06T 7/11 (2017.01)
G06T 7/30 (2017.01)
G06T 11/00 (2006.01)

(52) U.S. Cl.
CPC ...... G06T 7/30 (2017.01); *G06T 2207/10081* (2013.01); *G06T 2207/30164* (2013.01)

(56) References Cited

U.S. PATENT DOCUMENTS

| | | | |
|---|---|---|---|
| 6,850,589 B2* | 2/2005 | Heumann | G01N 23/046 378/19 |
| 8,010,315 B2* | 8/2011 | Wu | G06V 20/647 382/152 |
| 8,442,301 B2 | 5/2013 | Dragovich et al. | |
| 2009/0074278 A1* | 3/2009 | Beaulieu | A61B 6/583 382/131 |
| 2010/0150421 A1* | 6/2010 | Nakanishi | A61B 6/4085 378/4 |
| 2018/0158218 A1* | 6/2018 | Yoon | G06T 11/006 |
| 2021/0012544 A1* | 1/2021 | Lee | G06T 11/008 |
| 2022/0405990 A1* | 12/2022 | Chen | G06T 11/006 |

OTHER PUBLICATIONS

Amidror, Isaac "Scattered data interpolation methods for electronic imaging systems: a survey", Journal of Electronic Imaging, 11(2), p. 157-176, Apr. 2002.

Delaunay et al. "Bulletin de l'Academie des Sciences de l'URSS", Classe des sciences mathematiques et naturelles, vol. 6, p. 793-800, 1934.

ThermoFisher Scientific "Avizo Software—Materials characterization and quality control software for imaging data analysis and quality assurance", https://www.thermofisher.com/us/en/home/electron-microscopy/products/software-em-3d-vis/avizo-software.html. Accessed Apr. 19, 2022.

Bauer et al., "Accuracy analysis of a piece-to-piece reverse engineering workflow for a turbine foil based on multi-modal computed tomography and additive manufacturing", Aug. 2, 2019, Precision Engineering, vol. 60, pp. 63-75.

Weglewski et al., "Thermal conductivity of Cu-matrix composites reinforced with coated SiC particles: Numerical modeling and experimental verification", Feb. 4, 2022, International Journal of Heat and Mass Transfer, vol. 188.

Zeng et al., "Damage characterization and numerical simulation of shear experiment of plain woven glass-fiber reinforced composites based on 3D geometric reconstruction", Nov. 30, 2019, Composite Structures, vol. 233.

Nega et al., "Modeling manufacturing defect in interlaminar tensile specimen using x-ray computed tomography", 2018, KSAS 2018 Fall Conference.

Wielhorski et al., "Numerical modeling of 3D woven composite reinforcements: A review", Dec. 3, 2021, Composites Part A, vol. 154.

European Search Report for European Patent Application No. 23164807.2 dated Sep. 11, 2023.

* cited by examiner

METHOD AND APPARATUS FOR ANALYZING COMPUTED TOMOGRAPHY DATA

BACKGROUND

This application relates to a method and apparatus for analyzing computed tomography data.

It is known to use ceramic matrix composite (CMC) materials for aircraft components, such as turbine blade airfoils. CMC components are typically formed by injecting an infiltrant into layers of fiber material, such as laminate sheets, causing the infiltrant and fiber material to react and form a solid composite component. Voids may be formed in a CMC component, and those voids are of interest due to their effect on mechanical and thermal properties of the component.

Computed tomography ("CT") refers to a computerized x-ray imaging procedure in which a beam of x-rays is aimed at an object and quickly rotated around the object, producing signals that are processed by a computing device to generate cross-sectional images, or "slices," of the object.

Commercially available materials characterization software enables analysis of CT data for slices of components (e.g., CMC components), but such software is limited to analyzing planar slices of the component.

SUMMARY

A method of analyzing computed tomography data according to an example embodiment of the present disclosure includes obtaining computed tomography (CT) data for a component, fitting an interpolant function to the CT data, and creating a mesh of a surface that extends through the component. The surface is arbitrary and non-planar. The method also includes querying the interpolant function at a plurality of points of the mesh to project the CT data onto the mesh, calculating a metric of the component based on the querying, and providing a notification of the metric.

In a further embodiment of the foregoing embodiment, the method includes aligning a computer model of the surface with the CT data prior to said querying, such that the computer model of the surface and the CT data are aligned for the projection of the CT data onto the mesh.

In a further embodiment of any of the foregoing embodiments, said aligning the computer model of the surface with the CT data comprises performing a translation, a rotation, or both, of one or both of the computer model and the CT data.

In a further embodiment of any of the foregoing embodiments, the metric is a void area fraction of the component.

In a further embodiment of any of the foregoing embodiments, said fitting an interpolant function to the CT data includes utilizing a Delaunay triangulation.

In a further embodiment of any of the foregoing embodiments, the CT data is segmented CT data and the component is a ceramic matrix composite (CMC) component. The method includes obtaining initial CT data for the CMC component and segmenting the initial CT data between CMC and voids to obtain the segmented CT data.

In a further embodiment of any of the foregoing embodiments, the metric is a void area fraction of the surface that extends through the CMC component.

In a further embodiment of any of the foregoing embodiments, at least a portion of the surface includes an interfacial area where layers of the CMC component abut each other.

A system for computed tomography analysis according to an example embodiment of the present disclosure includes processing circuitry operatively connected to memory. The processing circuitry is configured to obtain computed tomography (CT) data for a component, fit an interpolant function to the CT data, and create a mesh of a surface that extends through the component. The surface is arbitrary and non-planar. The processing circuitry is also configured to query the interpolant function at a plurality of points of the mesh to project the CT data onto the mesh, calculate a metric of the component based on the query, and provide a notification of the metric.

In a further embodiment of the foregoing embodiment, the processing circuitry is configured to align a computer model of the surface with the CT data prior to the query, such that the computer model of the surface and the CT data are aligned for the projection of the CT data onto the mesh.

In a further embodiment of any of the foregoing embodiments, to align the computer model of the surface with the CT data, the processing circuitry is configured to perform a translation, a rotation, or both, of one or both of the computer model and the CT data.

In a further embodiment of any of the foregoing embodiments, the metric is a void area fraction of the component.

In a further embodiment of any of the foregoing embodiments, to fit the interpolant function to the CT data, the processing circuitry is configured to utilize a Delaunay triangulation.

In a further embodiment of any of the foregoing embodiments, the CT data is segmented CT data and the component is a ceramic matrix composite (CMC) component. The processing circuitry is configured to obtain initial CT data for the CMC component and segment the initial CT data between CMC and voids to obtain the segmented CT data.

In a further embodiment of any of the foregoing embodiments, the metric is a void area fraction of the surface that extends through the CMC component.

In a further embodiment of any of the foregoing embodiments, at least a portion of the surface includes an interfacial area where layers of the CMC component about each other.

A method of analyzing computed tomography data for a component of a gas turbine engine according to an example embodiment of the present disclosure includes obtaining computed tomography (CT) data for a ceramic matrix composite (CMC) component of a gas turbine engine, fitting an interpolant function to the CT data, and creating a mesh of a surface that extends through the CMC component. The surface is arbitrary and non-planar. The method also includes querying the interpolant function at a plurality of points of the mesh to project the CT data onto the mesh, calculating a void area fraction of the CMC component based on the querying, and providing a notification of the void area fraction.

In a further embodiment of the foregoing embodiment, the method also includes aligning a computer model of the surface with the CT data prior to said querying, such that the computer model of the surface and the CT data are aligned for the projection of the CT data onto the mesh. Said aligning comprises performing a translation, a rotation, or both, of one or both of the computer model and the CT data.

In a further embodiment of any of the foregoing embodiments, the CT data is segmented CT data. The method includes obtaining initial CT data for the CMC component and segmenting the initial CT data between CMC and voids to obtain the segmented CT data.

In a further embodiment of any of the foregoing embodiments, at least a portion of the surface includes an interfacial area where layers of the CMC component abut each other.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
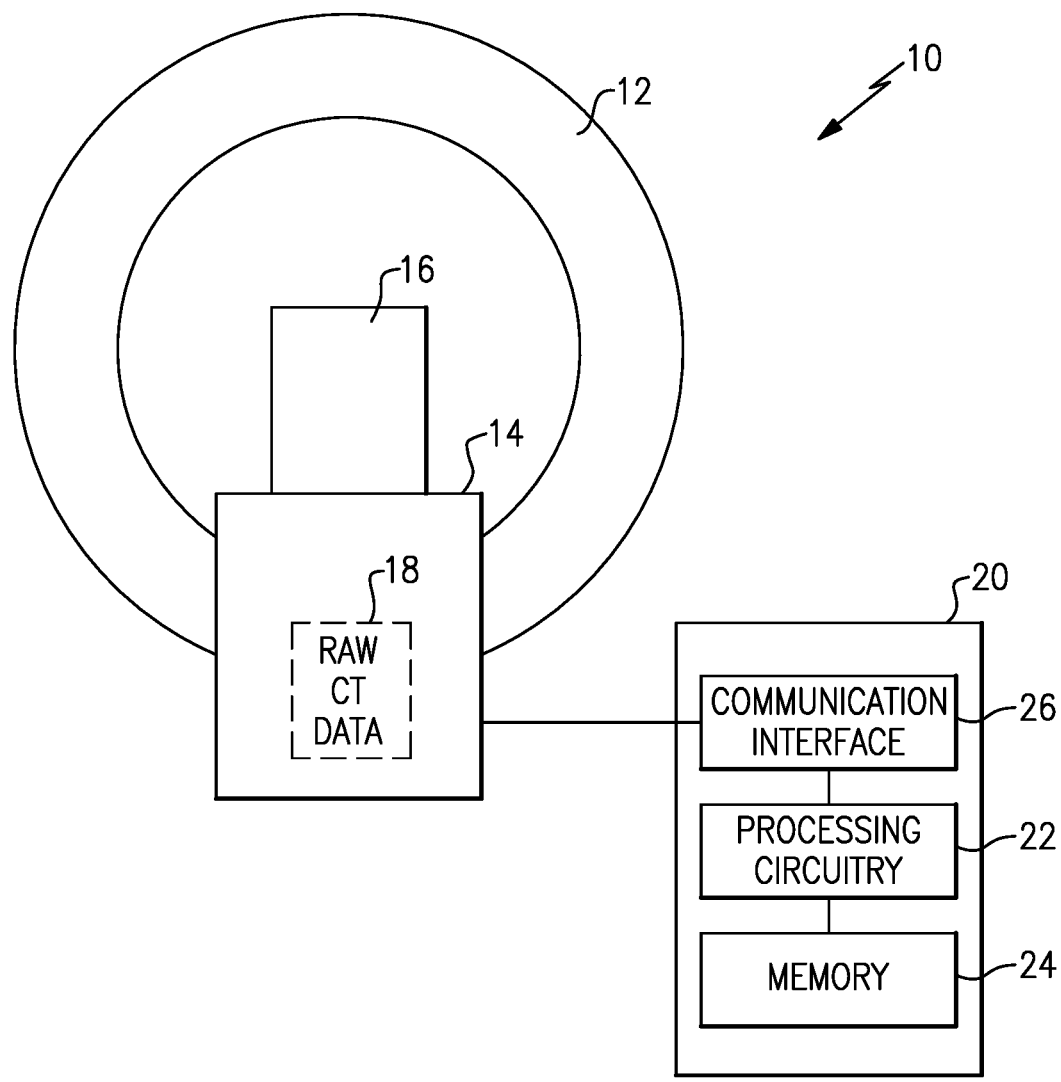
FIG. 1 is a schematic view of an example system for analyzing CT data.

FIG. 1 is a schematic view of an example system 10 for analyzing computed tomography (CT) data. The system 10 includes a CT scanner 12 having a bed 14 onto which a component 16 can be placed for CT scanning. The CT scanner 12 scans the component 16 and determines raw CT data 18, which is then provided to a computing device 20 for processing. The component 16 may be a part of a vehicle, such as a CMC component, for example, that has multiple phases (e.g., CMC areas and voids). In one particular example, the component is a turbine blade for a gas turbine engine. Of course, it is understood that CMC components are only a non-limiting example, and that other types of components 16 could be used (e.g., non-CMC components, components that are not utilized in gas turbine engines, human tissue, etc.).

The computing device 20 includes a processing circuitry 22 operatively connected to memory 24 and a communication interface 26. The processing circuitry 22 may include one or more microprocessors, microcontrollers, application specific integrated circuits (ASICs), or the like, for example.

The memory 24 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 24 may incorporate electronic, magnetic, optical, and/or other types of storage media. The memory 24 can also have a distributed architecture, where various components are situated remotely from one another, but can be accessed by the processing circuitry 22.

The communication interface 26 is configured to facilitate communication between the computing device 20 and the CT scanner 12 through wired and/or wireless communication.

Although only a single computing device 20 is shown, it is understood that the processing circuitry may be provided in multiple computing devices, each of which perform one or more of the features discussed herein.

Figure 2:
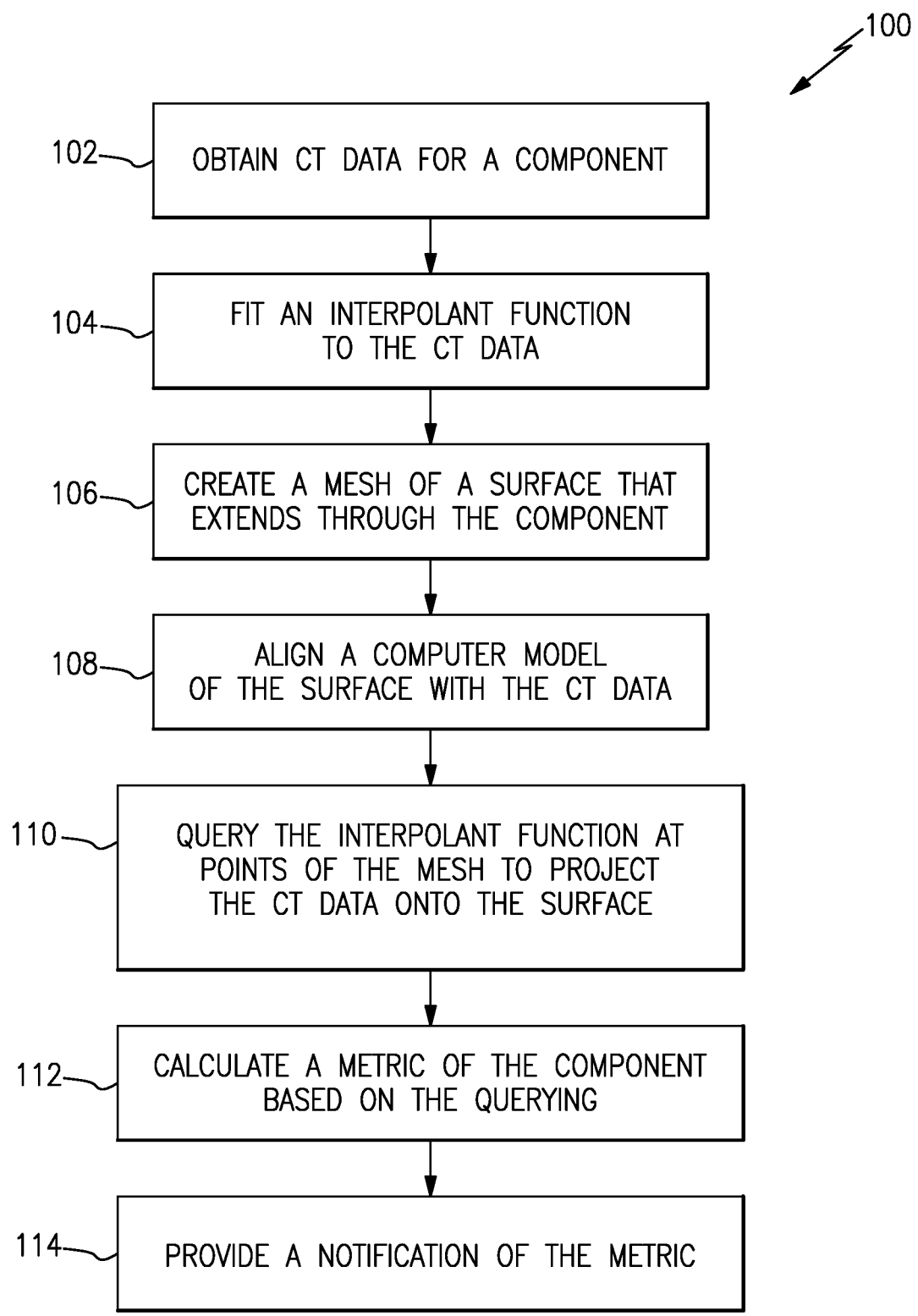
FIG. 2 is a flowchart of an example method of analyzing CT data.

FIG. 2 is a flowchart of an example method 100 of analyzing CT data of arbitrary, non-planar surfaces that extend through (and thereby intersect) the component 16. The method 100 may be performed by the computing device 20, for example. The method 100 is not limited to analyzing a single surface at a time. In one example, multiple surfaces that extend through the component CT data can be queried in parallel or individually.

The surfaces to be analyzed using the method 100 may be curved in all three directions, for example. As used herein, a "surface" does not need to be an exterior surface, and may include a slice that extends through the component 16. In one example, the selected surface corresponds to an interfacial area where layers of the component 16 (e.g., CMC plies) come together and abut each other.

Segmented CT data for the component 16 is obtained (step 102). In one example, step 102 includes obtaining initial CT data for the component 16 (e.g., the raw CT data 18), and segmenting the initial CT data based on a specific segmentation resolution and selection of phases. The resolution and phases may be user-selected, for example. Some example phases could include alpha and beta phases of a titanium structure for example, or CMC areas and voids in a CMC component, or heart tissue and non-tissue areas in a human heart, for example.

Commercially available software for 3D image processing/model generation/materials characterization that can perform CT data segmentation are known to those of ordinary skill in the art. Segmented CT data is typically stored in Digital Imaging and Communications in Medicine (DICOM) files.

If a void area fraction is desired, a user may choose to segment the CT data between CMC and voids, with each being assigned a different pixel value. Once the images are segmented and exported to the DICOM format, this data can then be imported for processing (e.g., using models built with Matlab or Python, for example). Importing the sequence of DICOM image files results in a 3D array of values representing the voxel values in a regular grid covering the scanned domain (i.e., uniform point cloud). Along with the pixel values, DICOM files contain metadata such as pixel spacing along the rows and columns and sequential image spacing.

An interpolant function is fitted to the CT data based on the 3D array of pixel values and the associated metadata (e.g., pixel spacing) (step 104). Triangulation or tetrahedrization based methods, such as Delaunay triangulation, may be used to perform step 104. Some other methods that may be used in some examples are inverse distance weighted methods, radial basis function methods, and natural neighbor methods.

A mesh of a surface that extends through the component 16 is created, where the surface is arbitrary and non-planar (step 106). As discussed above, the surface does not need to be an exterior surface, and may include a slice through the component 16 (e.g., a virtual surface). In one example, the surface includes an interfacial area where layers of a CMC component abut each other.

The "meshing" of step 106 may include utilizing commercially available finite mesh analysis computer software to generate polygons and/or polyhedrals that connect in a series of lines and points to approximate a geometry of the component 16.

A computer model (e.g., a CAD model) of a non-planar surface that extends through the component 16 is aligned or "registered" with the CT data (step 108). This includes performing a translation, a rotation, or both, of one or both of the computer model and the CT data. A location and orientation of the component 16 in the segmented CT data and a mathematical representation of a geometry of the surface that extends through the component 16 in the computer model, with respect to a global coordinate system, are likely different prior to alignment, so the alignment/registration step may be used to address that discrepancy. The alignment step 108 may include a translation T and/or rotation M on the computer model of the surface that extends through the component 16 to align with the segmented CT data (or vice versa) so that the two are geometrically aligned.

In one example, the alignment of step 108 is performed using commercially available software 3D image processing/model generation software, where once aligned, the resulting rotation matrix and translation vector can be output and used to transform any arbitrary surface that extends through the component 16.

Figure 3:
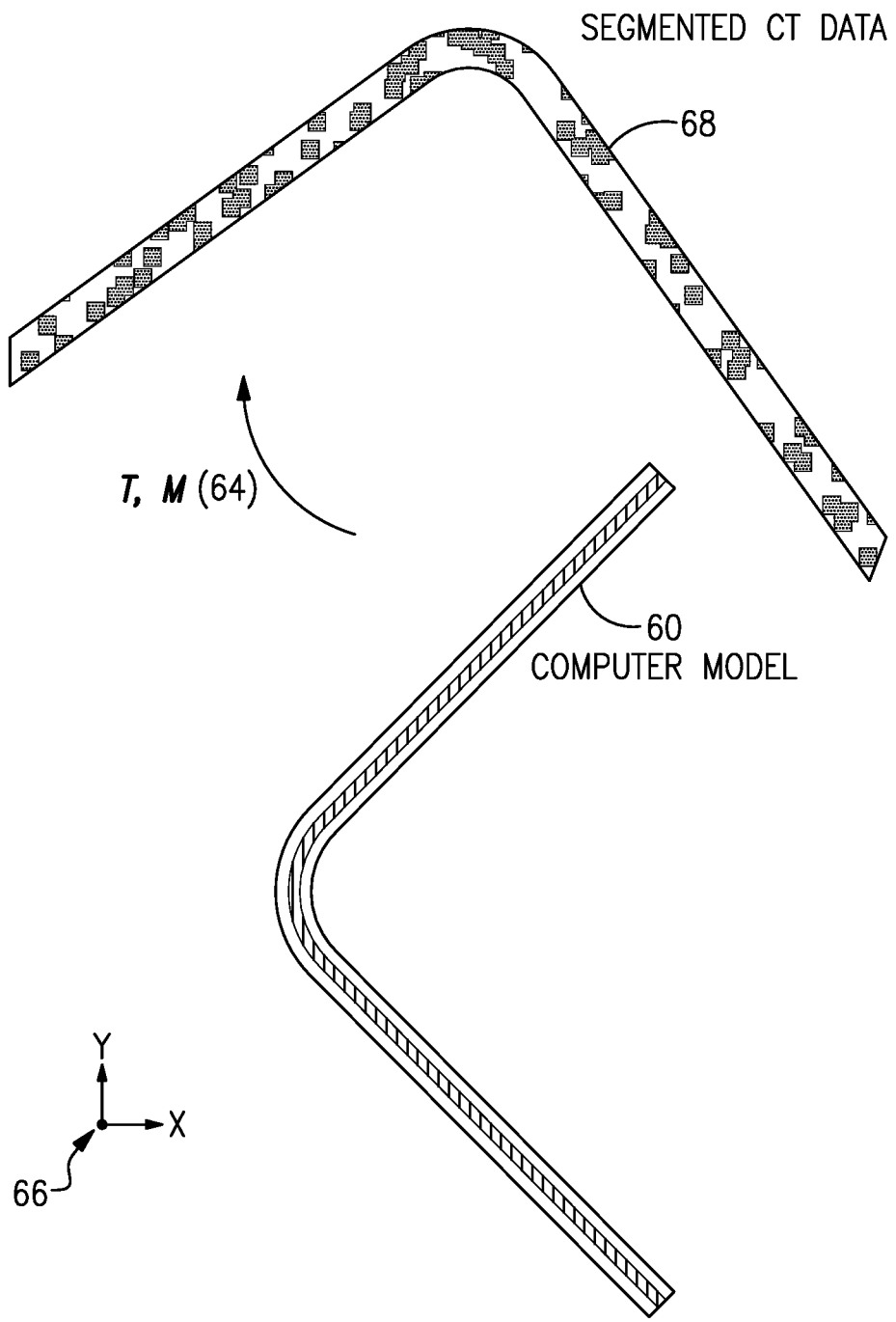
FIG. 3 schematically illustrates an example rotation and translation of a computer model of a surface that extends through a component with respect to a coordinate system to be aligned with segmented CT data.

FIG. 3 schematically illustrates an example rotation and translation of a computer model 60 of a surface that extends through a component with respect to a coordinate system to be aligned with the segmented CT data 68. The translation and rotation is schematically shown as 64 in FIG. 3.

In one example, instead of using an alignment feature in software, the alignment process is performed manually. For example, a translation vector can be obtained by determining points that should be coincident on the model geometry and in the segmented CT data, represented in the same global coordinate system. The difference in these points along the three Cartesian axes will provide the necessary translation (e.g., [dx, dy, dz]) of the model geometry. To determine the appropriate rotation of the body in 3D space, representations of rotations such as axis-angle pair, rotation matrix, Euler angles, and quaternions may be employed to fully align or "register" the surface intersecting the component 16 with the CT data. These methods are known to those of ordinary skill in the art, and therefore are not discussed in detail herein.

Once the interpolant has been fit and the computer model and CT data aligned/registered, the interpolant function is queried at points of the surface mesh to project the CT data onto the surface (step 110). This involves projecting the phase (e.g., CMC or void) at the points. Possible interpolation techniques include linear, nearest neighbor, natural neighbor, cubic, or other higher order polynomials functions, for example.

A metric of the component 16 is calculated (step 112) based on the querying of step 110, and a notification of the metric is provided (step 114).

The metric determined in step 112 may include a phase area fraction, such as a void area fraction, for example. Other examples of metrics that may be determined from the information gathered in step 112 include coefficient of thermal expansion, thermal conductivity, strength of an interface, fracture toughness, interfacial stiffness, interfacial strength, etc. If one has the phase area fraction of the component 16 and knows the physical properties of each phase (e.g., coefficient of thermal expansion, conductivity, stiffness), one can calculate these physical properties of the component 16 as a whole. Thus, in one example, for computing one or more of these other example metrics, the method 100 includes an additional step to map the phase area fraction to some physical metric such as interfacial strength.

The notification of step 114 could include providing a visual indication on an electronic display (e.g., on a graphical user interface), providing an auditory notification, and/or could include saving the metric of step 112 in the memory 24, for example.

Figure 4:
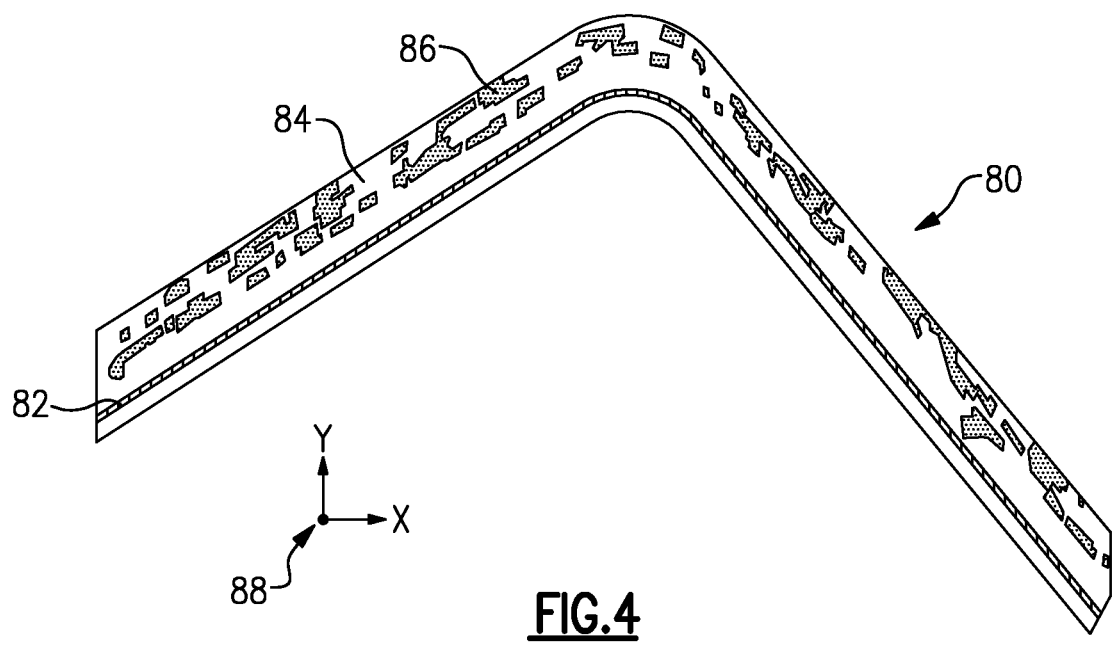
FIG. 4 schematically illustrates an example component and a selected surface that extends through the component.
Figure 5:
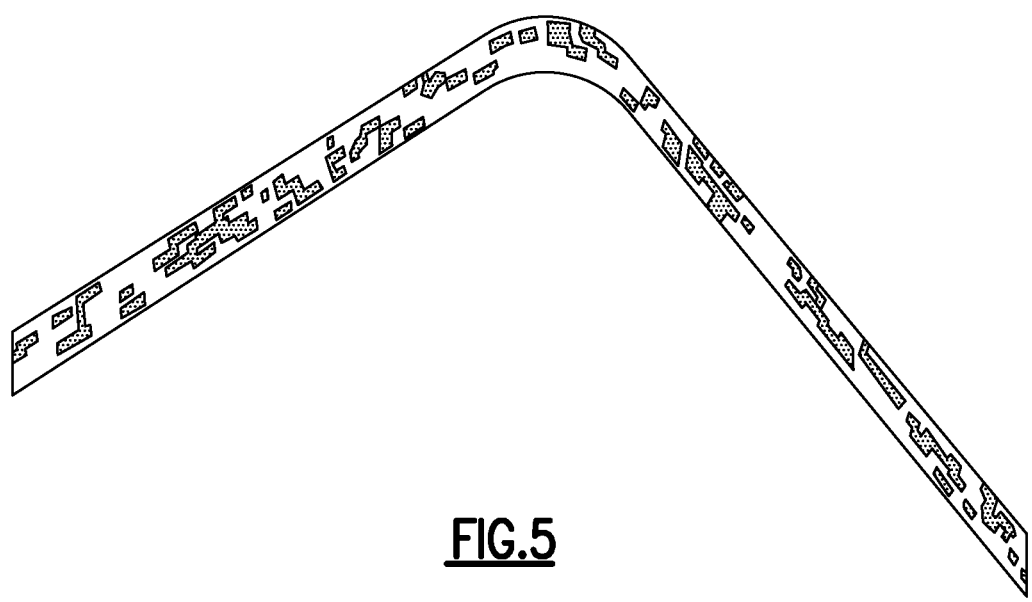
FIG. 5 schematically illustrates an example projection of computed tomography data onto the selected surface of FIG. 4.

FIGS. 4-5 provide an example of step 110.

FIG. 4 schematically illustrates an example component 80, which includes a selected surface 82, CMC areas 84, and cuboid void areas 86 dispersed throughout the component 80. The selected surface 82 is non-planar, is not aligned with the Cartesian axes (shown at 88), and is a slice of the component 80.

FIG. 5 schematically illustrates an example projection of CT data onto the selected surface of FIG. 4, which enables a void area fraction to be determined (e.g., $v_v^{surface}$=31.2%) and/or other metrics of interest, such as thermal or mechanical properties.

The method 100 discussed above provides a general approach to characterize the location-specific microstructure of specimens and parts. As discussed above, this process could be applied to CMC components to separate the porosity along a ply boundary and quantify the void area fraction on any arbitrary surface passing through the CT data (e.g., ply interfaces). In other words, the developed methodology can be used to separate out relative fractions of two or more phases along any arbitrary path or surface.

Since it is known that the local void area fraction affects elastic, thermal, and interfacial fracture properties, quantification of this property can help improve prediction of specimen and part behavior, including failure. The developed process, in addition to being general, requires minimal ad hoc preprocessing. Thus, its application to a variety of CMC and/or non-CMC specimens and parts is straightforward and could be automated.

Quantification of the spatial distribution of phases in a material microstructure is often desirable. In the case of ceramic matrix composite (CMC) microstructures characterized using computed tomography (CT), the area fraction of the void phase on the ply interfacial surfaces is of interest due to its effect on mechanical and thermal properties. While these interfaces may be planar with normals aligned with the Cartesian axes for flat panels and specimens, parts and complex specimens often contain non-planar interfaces with arbitrary orientation and curvature. Therefore it is advantageous to be able to quantify directly the phase area fraction on an arbitrary surface in CT data, and the method 100 can be used to achieve this.

The challenges associated with quantifying the spatially-varying void fraction in CMC components exist in all industries where CMCs and structural ceramics are utilized. Therefore, the method 100 may be useful for the aerospace, defense, and power generation (e.g., fossil fuel and nuclear) industries.

Although the steps of the method 100 have been depicted in a particular order, it is understood that certain ones of the steps could be reordered. For example, step 106 could be performed before step 104 if desired.

Although CMC components are discussed in detail above, it is understood that the present disclosure is not limited to CMC components, and that other non-CMC components could be analyzed using the techniques discussed herein.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of analyzing computed tomography data, comprising:

obtaining computed tomography (CT) data for a component;

fitting an interpolant function to the CT data;

creating a mesh of a surface that extends through the component, wherein the surface is arbitrary and non-planar;

aligning a computer model of the surface with the CT data;

querying the interpolant function at a plurality of points of the mesh to project the CT data onto the mesh;

calculating a metric of the component based on the querying; and providing a notification of the metric;

wherein said aligning is performed prior to said querying, such that the computer model of the surface and the CT data are aligned for the projection of the CT data onto the mesh.

2. The method of claim 1, wherein said aligning the computer model of the surface with the CT data comprises performing a translation, a rotation, or both, of one or both of the computer model and the CT data.

3. The method of claim 1, wherein the metric is a void area fraction of the component.

4. The method of claim 1, wherein said fitting an interpolant function to the CT data includes utilizing a Delaunay triangulation.

5. The method of claim 1, wherein the CT data is segmented CT data, the component is a ceramic matric composite (CMC) component, and the method comprises:
   obtaining initial CT data for the CMC component; and
   segmenting the initial CT data between CMC and voids to obtain the segmented CT data.

6. The method of claim 5, wherein the metric is a void area fraction of the surface that extends through the CMC component.

7. The method of claim 1, wherein at least a portion of the surface includes an interfacial area where layers of the CMC component abut each other.

8. A system for computed tomography analysis, comprising:
   processing circuitry operatively connected to memory, the processing circuitry configured to:
   obtain computed tomography (CT) data for a component;
   fit an interpolant function to the CT data;
   create a mesh of a surface that extends through the component, wherein the surface is arbitrary and non-planar;
   align a computer model of the surface with the CT data;
   query the interpolant function at a plurality of points of the mesh to project the CT data onto the mesh;
   calculate a metric of the component based on the query; and
   provide a notification of the metric;
   wherein the processing circuitry is configured to perform the alignment of the computer model of the surface with the CT data prior to the query, such that the computer model of the surface and the CT data are aligned for the projection of the CT data onto the mesh.

9. The system of claim 8, wherein to align the computer model of the surface with the CT data, the processing circuitry is configured to perform a translation, a rotation, or both, of one or both of the computer model and the CT data.

10. The system of claim 8, wherein the metric is a void area fraction of the component.

11. The system of claim 8, wherein to fit the interpolant function to the CT data, the processing circuitry is configured to utilize a Delaunay triangulation.

12. The system of claim 8, wherein the CT data is segmented CT data, the component is a ceramic matric composite (CMC) component, and the processing circuitry is configured to:
    obtain initial CT data for the CMC component; and
    segment the initial CT data between CMC and voids to obtain the segmented CT data.

13. The system of claim 12, wherein the metric is a void area fraction of the surface that extends through the CMC component.

14. The system of claim 12, wherein at least a portion of the surface includes an interfacial area where layers of the CMC component abut each other.

15. A method of analyzing computed tomography data for a component of a gas turbine engine:
    obtaining computed tomography (CT) data for a ceramic matrix composite (CMC) component of a gas turbine engine;
    fitting an interpolant function to the CT data;
    creating a mesh of a surface that extends through the CMC component, wherein the surface is arbitrary and non-planar;
    aligning a computer model of the surface with the CT data;
    querying the interpolant function at a plurality of points of the mesh to project the CT data onto the mesh;
    calculating a void area fraction of the CMC component based on the querying; and
    providing a notification of the void area fraction;
    wherein said aligning is performed prior to said querying, such that the computer model of the surface and the CT data are aligned for the projection of the CT data onto the mesh.

16. The method of claim 15, wherein the CT data is segmented CT data, the method comprising:
    obtaining initial CT data for the CMC component; and
    segmenting the initial CT data between CMC and voids to obtain the segmented CT data.

17. The method of claim 15, wherein at least a portion of the surface includes an interfacial area where layers of the CMC component abut each other.

* * * * *